United States Patent [19]
Walters et al.

[11] Patent Number: 5,966,369
[45] Date of Patent: Oct. 12, 1999

[54] REDUCING CORRUGATIONS IN OPTICAL RECORDING DISCS

[75] Inventors: David W. Walters, Walworth; Richard L. Cinotti, Rochester, both of N.Y.

[73] Assignee: Eastman Kodak Company, Rochester, N.Y.

[21] Appl. No.: 08/839,003

[22] Filed: Apr. 23, 1997

[51] Int. Cl.$^6$ .............................. G11B 3/70; G11B 5/855
[52] U.S. Cl. .................................................. 369/286
[58] Field of Search .................................. 369/283, 286, 369/288, 275.4; 428/64.2, 64.3, 64.4, 64.7, 64.8; 430/270.11

[56] References Cited

U.S. PATENT DOCUMENTS

| | | | |
|---|---|---|---|
| 5,486,396 | 1/1996 | Mizuzuki et al. | 369/283 |
| 5,616,450 | 4/1997 | Arai et al. | 430/321 |

*Primary Examiner*—George J. Letscher
*Attorney, Agent, or Firm*—Pamela R. Crocker

[57] ABSTRACT

An optical recording disc and a method of making such disc is disclosed. The disc has inner and outer peripheral edges, and includes a transparent substrate having a first portion corresponding to a recording area where data are recorded and a second portion corresponding to a non-recording area which extends from the recording area to a position adjacent to the outer peripheral edge of the disc. A continuous groove is formed in the substrate and extends over the first and second portions of the transparent substrate. The disc further includes a recording layer formed over the first and second portions of the transparent substrate and extending to a position so that the recording layer covers only a part of the groove in the second portion of the substrate whereby the outermost part of the groove is not covered by the recording layer.

7 Claims, 3 Drawing Sheets

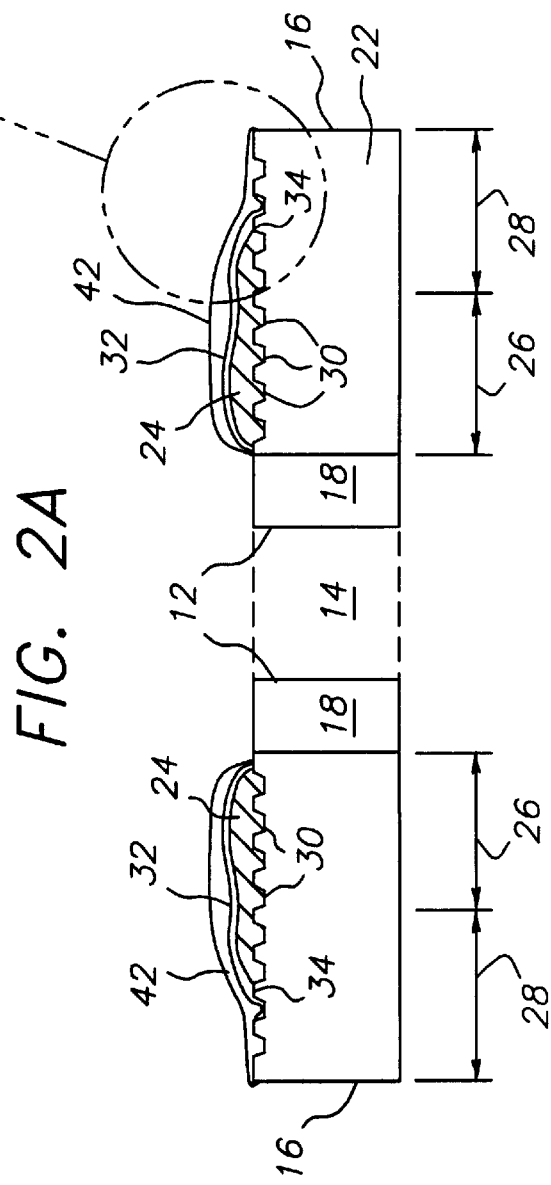

REDUCING CORRUGATIONS IN OPTICAL RECORDING DISCS

FIELD OF THE INVENTION

The present invention relates to optical recording discs and a method of making them so as to reduce corrugations in the recording layer of such discs.

BACKGROUND OF THE INVENTION

Optical recording discs of the write-once or rewriteable type include a substrate having a recording layer. The substrate is formed by injection molding to include a wobbled groove on the surface of the substrate where the recording layer is formed. The groove defines recording channels on the disc for recording data and also provides for tracking of the disc while writing or reading data. The groove, which is a frequency modulated signal after detection and processing, also contains addressing and other information that are necessary for the write and read processes. The groove is usually in accordance with Orange Book standards. "Orange Book" is a licensed specification published by Philips Corporation and Sony Corporation which defines key properties of recordable compact disc (CD-R) media and recording procedures.

The recording layer, which can include an organic dye, is deposited on the substrate so as to completely cover the groove. The recording layer can be deposited by various techniques, including spin-coating, gravure, roller, flexographic, and vapor phase deposition. A reflective layer is then formed over the entire recording layer using similar techniques. The reflective layer can be, for example, gold, silver, or copper.

Because the reflective layer does not adhere well to the deposited recording layer, the outer region of the substrate must be substantially free of the recording layer to ensure proper adhesion of the reflective layer to the substrate. However, during deposition of the recording layer, the outer region of the substrate becomes wholly or partially coated with a residual portion of the recording layer. Consequently, the residual portion of the recording layer must be removed from the outer region of the substrate prior to deposition of the reflective layer. In a manner well known in the art, a dye compatible solvent is directed onto the outer region of the rotating disc to dissolve and remove the residual portion of the recording layer from the substrate. However, during evaporation and drying of the solvent, a portion of the recording layer uncontrollably bleeds outward toward the outer peripheral edge of the disc and forms undesirable corrugations at the outermost region of the substrate. The corrugations, which can extend for approximately one to three millimeters from the desired outer edge of the recording layer toward the outer edge of the substrate, substantially reduce the adhesion of the reflective layer to the substrate, as well as result in a deteriorated appearance of the recording layer. Poor adhesion reduces the durability, and thus, the useful lifetime of the disc. Additional application of solvent does not eliminate the corrugations.

In addition, as the solvent is spun onto the substrate to remove the residual portion of the recording layer, a portion of the solvent wicks under the outer edge of the recording layer, causing the recording layer to be lifted from the substrate. As the solvent evaporates, the recording layer is redeposited onto the substrate in a nonuniform manner so that a bead of dye is formed on the substrate at the outermost edge of the recording layer. This edge bead is a weakness in the optical disc, causing delamination of the layers when the disc is subjected to physical abrasion during either manufacturing or subsequent usage of the disc. Thus, the edge bead further decreases the durability and useful lifetime of the disc. Furthermore, during application of the solvent, a containment apparatus is typically used to partially surround the disc and contain any solvent droplets which are formed during the cleaning process and could become redeposited onto the recording layer. These droplets cause recording layer defects, sometimes referred to as dropouts, which decreases the quality of the recorded data and could result in an unusable disc.

In order to provide sufficient cleaning of the substrate prior to deposition of the reflective layer, it is necessary to utilize a solvent having physical properties compatible with the recording dye and substrate materials. The choice of solvents becomes limited and potentially costly, and the cleaning time is increased because of the inefficiency of the available solvents. In addition, many of the available solvents can cause environmental damage.

SUMMARY OF THE INVENTION

It is an object of this invention to provide an optical recording disc having reduced corrugations in the recording layer.

It is a further object of this invention to provide an optical recording disc in which an increased selection of available solvents can be used to remove the residual portion of the recording layer from the substrate.

These objects are achieved by an optical recording disc having inner and outer peripheral edges, comprising:

(a) a transparent substrate having a first portion corresponding to a recording area where data are recorded and a second portion corresponding to a non-recording area which extends from the recording area to a position adjacent to the outer peripheral edge of the disc;

(b) means defining a continuous groove extending over the first and second portions of the substrate; and (c) a recording layer formed over the first and second portions of the substrate and extending to a position so that the recording layer covers only a part of the groove in the second portion of the substrate whereby the outermost part of the groove is not covered by the recording layer.

ADVANTAGES

An advantage of the present invention is to provide an optical recording disc having substantially reduced corrugations in the recording layer and improved appearance.

Another advantage of the present invention is to provide an optical recording disc having increased adhesion of the reflective and subsequent layers to the substrate.

Another advantage of the present invention is to provide an optical recording disc having an increased useful life.

Yet another advantage of the present invention is to provide an optical recording disc having increased recorded data quality.

A further advantage is to enable use of solvents which are less expensive and environmentally friendly, as well as more efficient so as to substantially shorten manufacturing cycle time.

BRIEF DESCRIPTION OF THE DRAWINGS

FIG. 2A is a cross-sectional view of the optical recording disc of FIG. 1 taken along the lines 2A—2A;

FIG. 2B is an enlarged view of a portion of the disc shown in FIG. 2A; and

FIG. 3A is a typical prior art optical recording disc showing corrugations and FIG. 3B is an optical recording disc in accordance with the present invention showing a lack of corrugations.

DETAILED DESCRIPTION OF THE INVENTION

Figure 1:
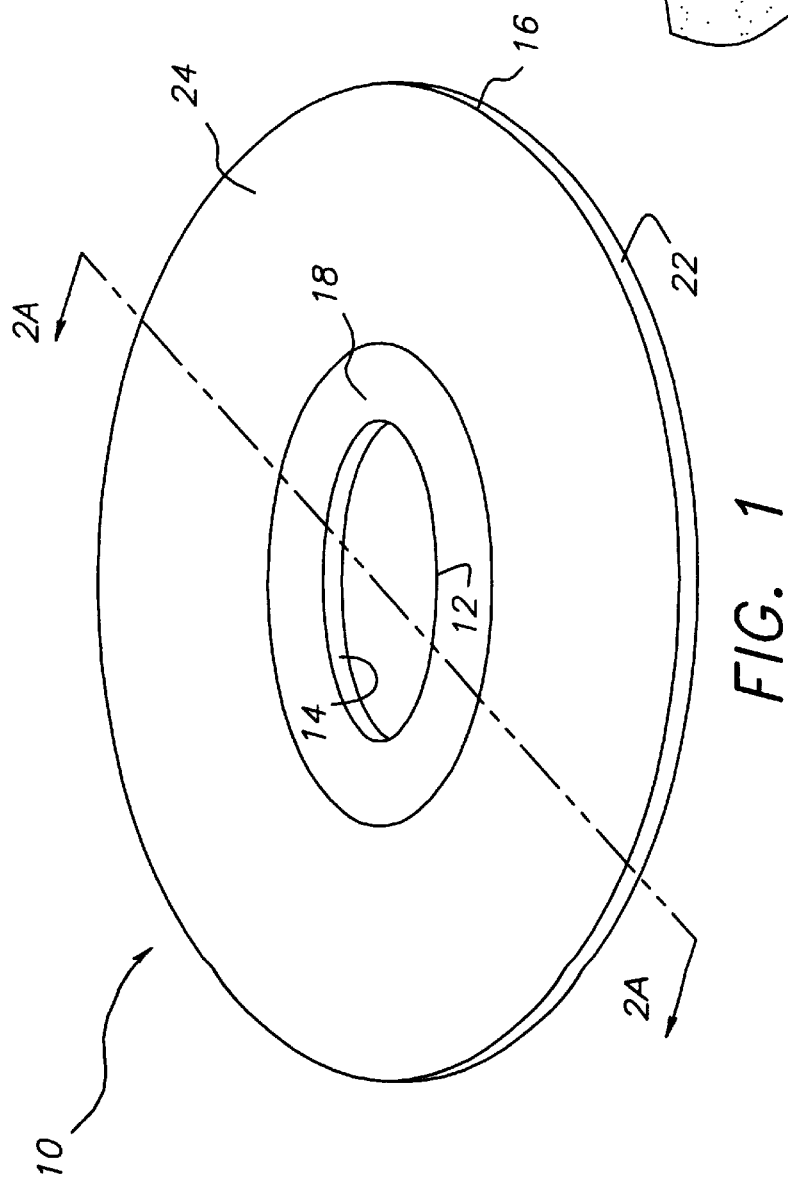
FIG. 1 is a perspective of an optical recording disc in accordance with the present invention.

Referring to FIG. 1, an optical recording disc 10 is shown in accordance with the present invention. The disc 10 has an inner peripheral edge 12, which defines a central hole 14, and an outer peripheral edge 16. The central hole 14 permits the disc 10 to be mounted in an optical disc transport device which can be used in either a reading or a writing mode. A clamping region 18 is adjacent the central hole 14, and is the portion of the disc 10 where the spindle clamp (not shown) secures the disc 10 to the spindle (not shown). The spindle clamp conventionally applies a force so that the clamping region 18 is pressed against the spindle. The disc 10 further includes a substrate 22 and a recording layer 24.

Referring now to FIG. 2A, a cross-sectional view of the disc 10 taken along the lines 2A—2A is shown. In accordance with the present invention, the substrate 22 is formed by injection molding to include a first portion 26 corresponding to a recording area where data is recorded and a second portion 28 corresponding to a non-recording area. The second portion 28 extends from the recording area to a position adjacent to the outer peripheral edge 16 of the disc 10. Preferably, the substrate 22 is formed from transparent molded plastics with polycarbonate being a preferred material. However, it would be understood by those skilled in the art that the substrate 22 could be formed from other materials, such as aluminum or glass.

During the injection molding process, the substrate 22 is formed to define a groove 30 on the surface of the substrate 22 where the recording layer 24 is deposited. In accordance with the present invention, the groove 30 is continuous and extends over the first and second portions 26 and 28 of the substrate 22 to within approximately 0.2 to 0.3 millimeters from the outer peripheral edge 16 of the disc 10. Preferably, the groove 30 is a continuous spiral. The area of the groove 30 extending over the first portion 26 of the substrate 22 is wobbled and conforms to Orange Book standards. This wobbled area of the groove 30 over the first portion 26 defines recording channels for recording data and also provides for tracking of the disc 10 while data are being recorded or read.

The non-recording area of the groove 30 extending over the second portion 28 of the substrate 22 does not have to be wobbled or conform to Orange Book standards since this area does not define recording channels and does not provide for tracking. However, one skilled in the art would understand that the groove 30 extending over the second portion 28 of the substrate 22 can be wobbled in accordance with Orange Book standards, or can be wobbled in a manner not defined by the Orange Book. For example, the non-recording area of the groove 30 can have a variation in frequency or amplitude, and can have a different width and depth than the recording area of the groove 30.

As shown in FIG. 2A, the recording layer 24 is deposited over the first and second portions 26 and 28 of the substrate 22, preferably by spin-coating a light absorbing organic dye on the substrate while the disc 10 is rotating. The recording layer 24 includes material which has a binder, a polymer, and an organic dye which changes properties upon actuation by laser light at a particular wavelength and above a particular density. Referring now to FIG. 2B, an enlarged view of a portion of the disc 10 of FIG. 1 is shown. As shown in FIG. 2B, the recording layer 24 extends to a position such that the recording layer 24 covers only a part of the groove 30 in the second portion 28 of the substrate 22 whereby the outermost part of the groove 30 is not covered by the recording layer 24. Preferably, the recording layer 24 is deposited on the substrate 22 so that the outer edge 34 of the recording layer 24 is within approximately 1.0 millimeter from the outer peripheral edge 16 of the disc 10.

During deposition of the recording layer 24, the outer region of the substrate 22 adjacent the outer peripheral edge 16 of the disc 10 becomes wholly or partially coated with a residual portion of the recording layer 24. Thus, prior to deposition of a reflective layer 32, the outer region of the substrate 22 is cleaned in a manner well known in the art by depositing a dye compatible solvent onto the outer region of the substrate 22 while the disc 10 is rotating. The solvent dissolves and removes the residual portion of the recording layer 24 on the outer region of the substrate 22. During evaporation and drying of the solvent, the outermost part of the groove 30 which is not covered by the recording layer 24 impedes the formation of corrugations, and thus, prevents the uncontrolled bleeding of the recording layer 24 which results in reduced adhesion of the reflecting layer 32 to the substrate 22. Durability of the disc 10 is increased, and the overall physical appearance of the disc 10 is improved by the lack of corrugations at the outermost region of the substrate 22.

In addition, the lack of corrugations shortens the required exposure time of the solvent, and thus increases the choice of available solvents. For example, a substrate damaging solvent, such as acetone, can now be used to remove the residual portion of the recording layer 24. Given the exposure time needed to remove the residual portion of the recording layer with prior art discs, such a solvent would damage the polycarbonate material of the substrate. However, with the shortened exposure time for the present invention, such solvents can be used. The solvent can also be applied to the disc 10 with less pressure, thus substantially reducing the potential for the redeposition of solvent droplets onto the recording layer 24 and the formation of dropouts. This results in increased quality of the recording layer 24, and ultimately, in an increase in the quality of data recorded on the disc 10.

Furthermore, when the solvent wicks under the recording layer 24, the recording layer 24 is redeposited uniformly on the surface of the substrate 22. The outer edge 34 of the recording layer 24 is physically bound by the outermost part of the groove 30 which is not covered by the recording layer 24, thereby preventing the formation of a bead of dye on the surface of the substrate 22 at the outermost edge of the recording layer 24. Thus, the disc 10 is more durable when subjected to physical abrasion, which increases the useful life of the disc 10.

Once the residual portion of the recording layer 24 has been removed from the substrate 22 during the cleaning process, the reflective layer 32 is deposited over the recording layer 24 in a manner well known in the art. Preferably, the reflective layer 32 is gold. In accordance with the present invention, the reflective layer 32 is deposited to cover the recording layer 24 as well as to cover a part of the second portion 28 of the substrate 22 beyond the outer edge 34 of the recording layer 24. Preferably, the part of the substrate 22 adjacent the outer peripheral edge 16 of the disc 10 remains uncovered by both the recording layer 24 and the reflective layer 32, as shown in FIG. 2B. A protective layer 42 is then deposited over the reflective layer 32 in a manner well known in the art. As shown in FIGS. 2A and 2B, the protective layer 42 extends over the region of the second portion 28 of the substrate 22 which is not covered by the recording layer 24 or the reflective layer 32. Since the outermost part of the groove 30 is not covered by the recording layer 24, the adhesion of the reflective layer 24 and the protective layer 42 to the substrate 22 substantially increases, resulting in increased durability and useful lifetime of the disc 10.

It would be understood by those skilled in the art that additional layers could be provided on the substrate, such as a smoothing layer. In addition, although recording is provided on one of the surfaces of the disc 10, as shown in FIG. 2A, recording can be provided on both the top and bottom surfaces of the disc 10.

Figure 3B:
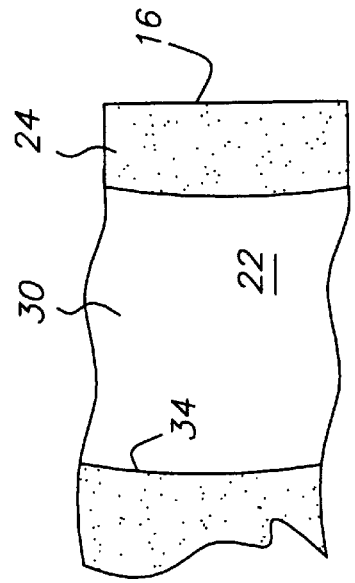
FIGS. 3A and 3B are top views of optical recording discs.
Figure 3A:
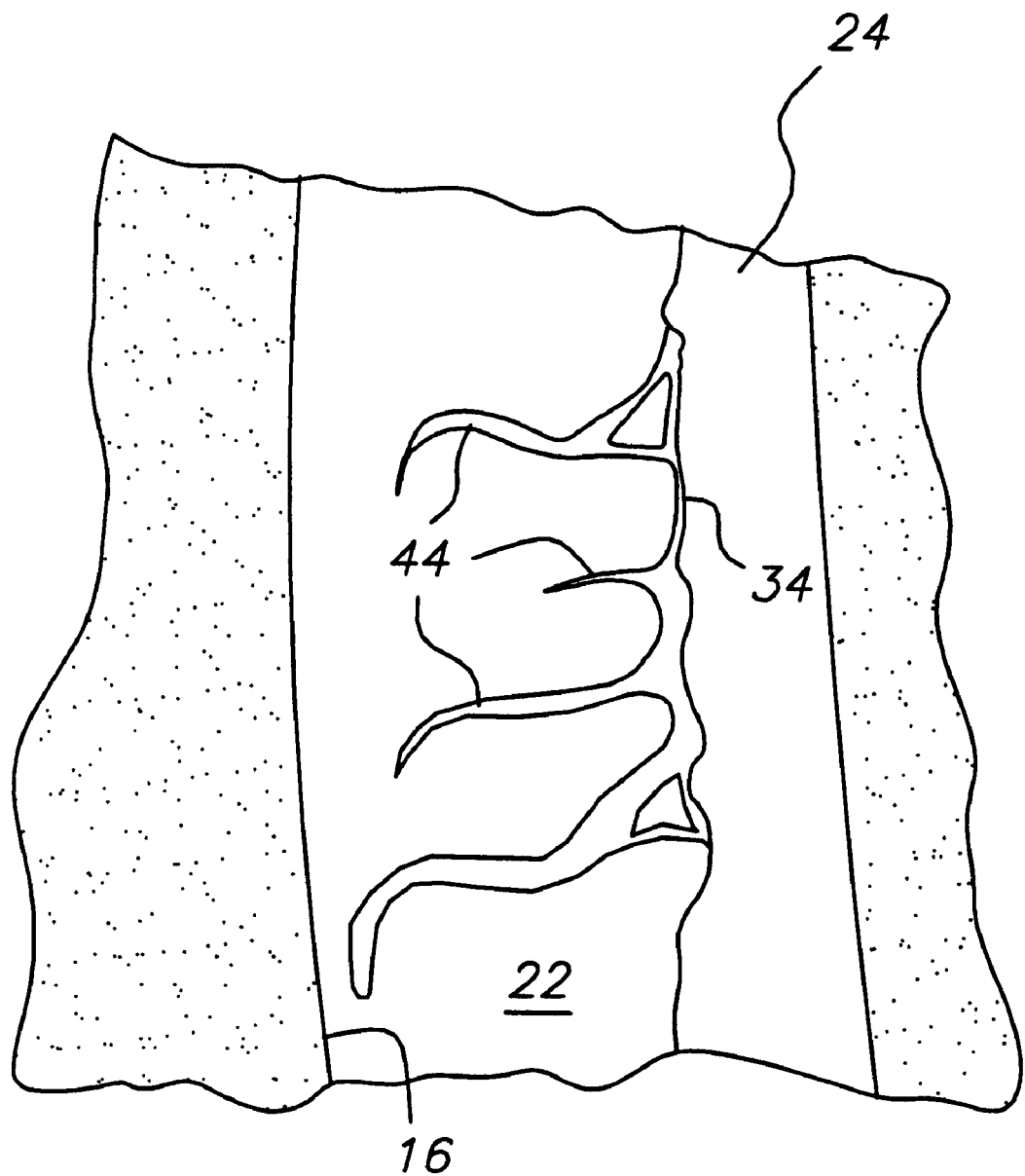

Referring now to FIGS. 3A and 3B, drawings are shown which are representative of photographs taken of a typical prior art optical recording disc and an optical recording disc in accordance with the present invention, respectively. Where parts or elements correspond to FIG. 2A, the same reference numerals will be used.

FIG. 3A shows a top view of the outer edge 34 of the recording layer 24 of a prior art disc. As can be seen in FIG. 3A, undesirable corrugations 44 are formed at the outermost region of the substrate 22 which extend toward the outer peripheral edge 16 of the disc. In addition, the outer edge 34 of the recording layer 24 has a deteriorated appearance.

FIG. 3B shows a top view of the outer edge 34 of the recording layer 24 of the disc 10 in accordance with the present invention. The outermost part of the groove 30 of the disc 10 is not covered by the recording layer 24. As shown in FIG. 3B, the disc 10 of the present invention contains no corrugations at the outermost region of the substrate 22. In addition, the overall physical appearance of the disc 10 is improved by the lack of corrugations at the outermost region of the substrate 22. There is a smooth transition between the outer edge 34 of the recording layer 24 and outermost part of the groove 30 which is not covered by the recording layer 24.

The invention has been described in detail with particular reference to a preferred embodiment thereof. However, it will be appreciated that variations and modifications can be effected by a person of ordinary skill in the art without departing from the spirit and scope of the invention.

PARTS LIST 10 optical recording disc
12 inner peripheral edge
14 central hole
16 outer peripheral edge
18 clamping region
22 substrate
24 recording layer
26 first portion
28 second portion
30 groove
32 reflective layer
34 outer edge
42 protective layer
44 corrugation

What is claimed is:

1. An optical recording disc having inner and outer peripheral edges, comprising:

(a) a transparent substrate having a first portion corresponding to a recording area where data are recorded and a second portion corresponding to a non-recording area which extends from the recording area to a position adjacent to an outer peripheral edge of the disc;

(b) a continuous groove extending over the first and second portions of the substrate; and (c) a recording layer formed over the first and second portions of the substrate and extending to a position so that the recording layer covers only a part of the groove in the second portion of the substrate whereby an outermost part of the groove is not covered by the recording layer impeding formation of corrugations.

2. The optical recording disc of claim 1 wherein the groove extends to the outer peripheral edge of the disc.

3. The optical recording disc of claim 1 wherein the groove is a continuous spiral.

4. The optical recording disc of claim 1 wherein the substrate is plastic which is molded to form the groove.

5. The optical recording disc of claim 4 wherein the molded plastic is polycarbonate.

6. The optical recording disc of claim 1 wherein the recording layer includes an organic dye.

7. The optical recording disc of claim 1 wherein the recording layer has an outer edge which is positioned approximately 1.0 millimeter from the outer peripheral edge of the disc.

* * * * *